United States Patent
Newcomb et al.

(10) Patent No.: US 6,545,707 B1
(45) Date of Patent: Apr. 8, 2003

(54) VIDEO SOURCE WITH ADAPTIVE OUTPUT TO MATCH LOAD

(75) Inventors: Russell Newcomb, Morgan Hill, CA (US); Timothy Hu, Los Altos, CA (US)

(73) Assignee: Oak Technology, Inc., Sunnyvale, CA (US)

(*) Notice: Subject to any disclaimer, the term of this patent is extended or adjusted under 35 U.S.C. 154(b) by 351 days.

(21) Appl. No.: 09/595,914

(22) Filed: Jun. 20, 2000

(51) Int. Cl.[7] ............................................... H04N 17/00
(52) U.S. Cl. ........................ 348/192; 348/180; 348/553
(58) Field of Search ............................ 348/180, 184, 348/189, 192, 193, 553, 571; 725/118, 148, 149, 127; H04N 17/00, 7/173, 7/16

(56) References Cited

U.S. PATENT DOCUMENTS 4,797,735 A * 1/1989 Takai et al. .................. 348/192
6,411,330 B1 * 6/2002 Purcell et al. ............... 348/180

* cited by examiner

*Primary Examiner*—Sherrie Hsia
(74) *Attorney, Agent, or Firm*—Townsend and Townsend and Crew LLP; Henry K. Woodward

(57) ABSTRACT

In a video system in which a video signal source transmits a video signal to a receiver over a transmission line, a method of maintaining a desired voltage level from the video signal source includes the steps of monitoring the level of voltage at the output of the video signal source, and adjusting an input to the video signal source as necessary in order to maintain a desired level of voltage. Thus, when the impedance of the transmission line and receiver change, the output voltage from the video signal source is maintained at a desired level without clipping of the signal when the video signal source is overdriven.

10 Claims, 2 Drawing Sheets

VIDEO SOURCE WITH ADAPTIVE OUTPUT TO MATCH LOAD

BACKGROUND OF THE INVENTION

This invention relates generally to a video source which drives a video receiver with a signal transmitted over a transmission cable, and more particularly the invention is directed to adapting the video source output to match the receiver load.

Video signal sources typically drive a video receiver through a cable transmission line. During normal operation the video output is designed to have two termination resistors, one locally at the source and one at the receiver end of the cable, in order to prevent signal reflections in the cable. However, if only one of the two termination resistors are present, the video source output can double in voltage which results in output signal clipping.

The present invention is directed to adapting the video source output to match a variable load.

SUMMARY OF THE INVENTION

In accordance with the present invention a video source is connected to a video receiver through a cable transmission line with the transmission line having one or more load resistors associated therewith. A level detector is provided to detect the output signal from the video source and control the input to the video source as necessary to maintain a desired level for the output signal.

In a preferred embodiment, the video source comprises a current digital to analog converter (DAC), and the level detector comprises a pair of comparators which compare the DAC output to two voltage levels and control a scaler for the input signal to the DAC as necessary to maintain a desired voltage level. Accordingly, if the load impedance increases and the video output increases, the video to the DAC can be reduced. Conversely, if the load impedance decreases and signal output decreases in value, the input to the DAC can be increased in order to maintain the desired output voltage level.

The invention and objects and features thereof will be more readily apparent from the following detailed description and dependent claims when taken with the drawing.

DETAILED DESCRIPTION OF ILLUSTRATIVE EMBODIMENTS

Figure 1:
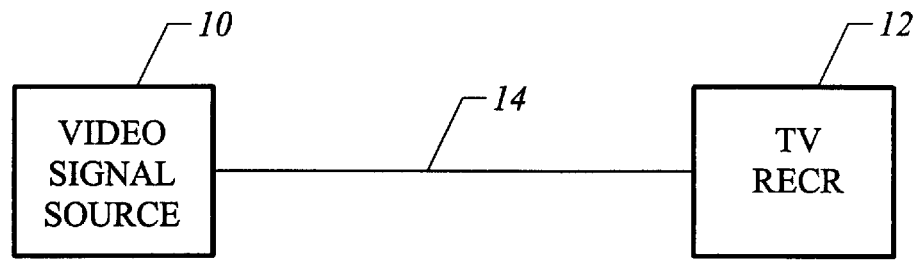
FIG. 1 is a functional block diagram illustrating a video signal source driving a video receiver through a cable transmission line.

FIG. 1 is a functional block diagram of a video system in which the present invention is employed. As shown in FIG. 1, a video signal source 10 drives a TV receiver 12 through a 75 ohm cable transmission line 14. Typically, as illustrated in FIG. 2 the cable 14 has a 75 ohm impedance 16 at the input and a 75 ohm impedance 18 at the output for impedance matching and suppression of signal reflections in cable 14.

Figure 2:
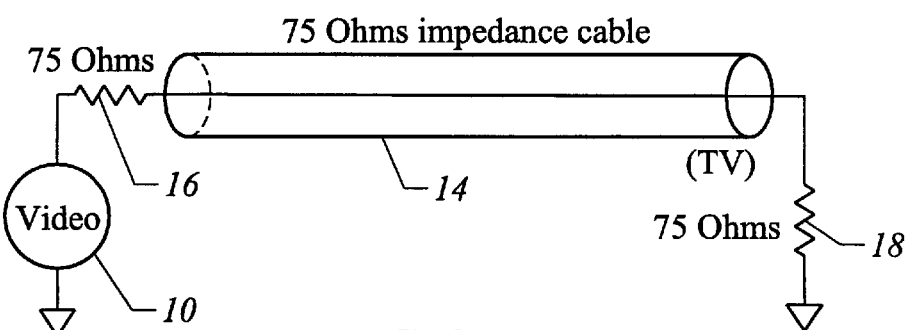
FIGS. 2 and 3 are electrical schematics of possible implementations of the circuitry of FIG. 1.
Figure 3:
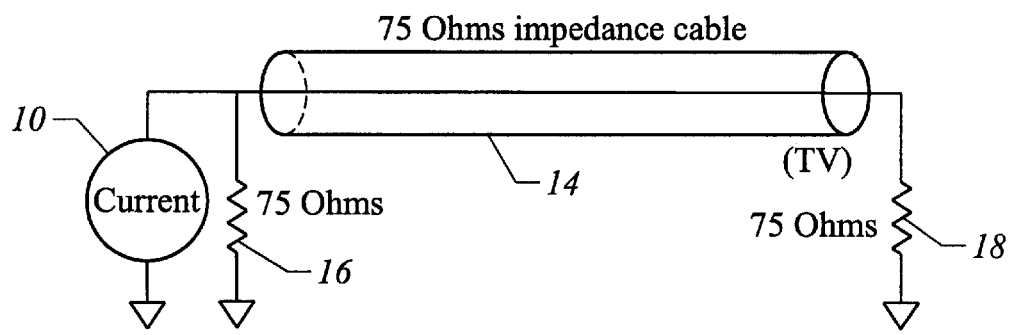

FIG. 3 is a similar schematic in which the video source is a current DAC 10 and the input impedance 16 is a shunt impedance to ground rather than a serial impedance as in FIG. 2.

The output of the video source is scaled to provide a required output voltage, usually about 1.2 volts maximum, when there is a termination at both ends of the transmission cable. However, when there is no termination at the receiver end of the cable, the output voltage then doubles to about 2.4 volts. This can cause problems because the DAC current source usually cannot properly output this larger output voltage without clipping. Further, there may be other devices on the output pin of the cable, such as a TV modulator which will only work properly when given the expected input of about 1.2 volts.

Figure 4:
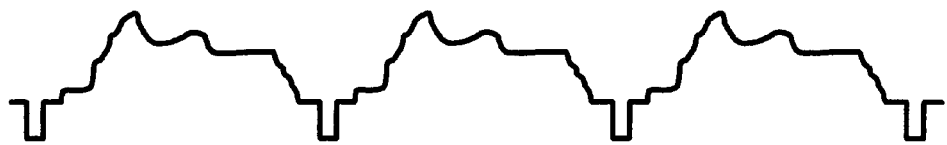
FIG. 4 illustrates a video signal from the video source.

FIG. 4 illustrates a standard analog video waveform. For every horizontal line (roughly every 60 microseconds) there is an area where the output voltage level is always supposed to be approximately 300 millivolts. In accordance with a preferred embodiment of the invention, during this time the output voltage from the video source is detected, and the input to the video source is appropriately adjusted to bring the output voltage to the desired voltage level.

Figure 5:
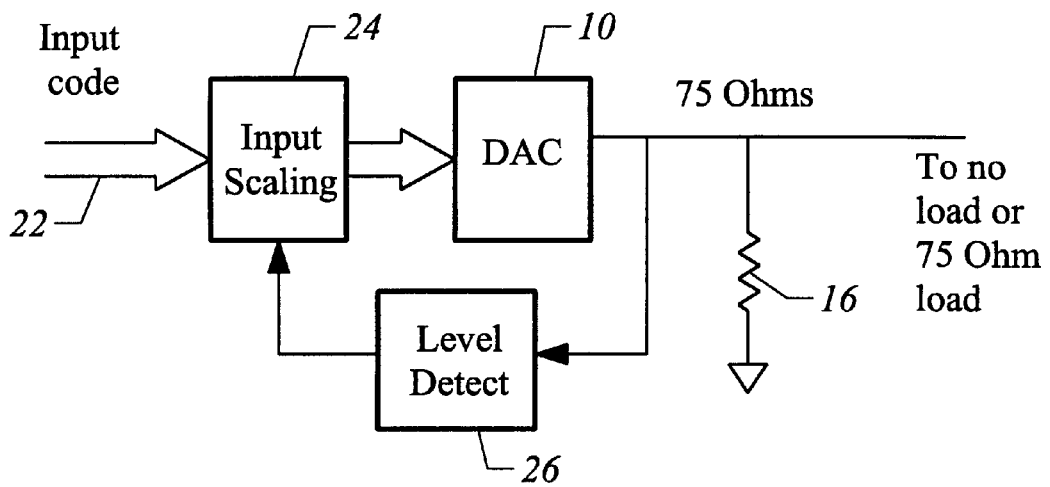
FIG. 5 illustrates circuitry in accordance with one embodiment of the invention for maintaining a desired voltage level for the video signal source output.

FIG. 5 is a schematic of one embodiment of level detection circuitry in accordance with the invention. A digital input code 22 is applied through a digital input scaler 24 to an input of DAC 10. The output of DAC 10 is detected by level detector 26 for variances in a desired output voltage, and level detector 26 controls input scaler 24 as necessary to bring the output voltage from DAC 10 to the desired voltage level. As noted above, for every horizontal line there is an area where the output level is supposed to be roughly 300 millivolts. During this time the level detect circuit determines whether the output level is roughly 150 millivolts, 300 millivolts, or 600 millivolts, and then controls input scaler 24 accordingly to realize the desired 300 millivolts. The input scaling block can be a simple multiplexer which either passes data through directly or divides the input by a factor of two if the output voltage is too high. Division of the input code by two is accomplished by shifting the input digital data one bit.

Figure 6:
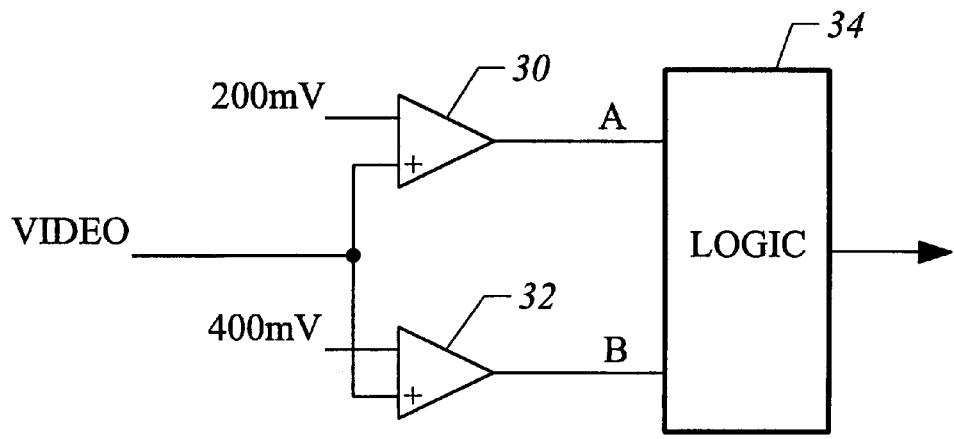
FIG. 6 is a schematic of one embodiment of a level detector in FIG. 5.

FIG. 6 is one embodiment of a level detect logic for use in the level detector 26 of FIG. 5. Two comparators 30, 32 receive the video output signal from DAC 10 and compare the video signal to 200 millivolt voltage and a 400 millivolt voltage, respectively. Output A of comparator 30 is a "1" when the video signal exceeds 200 millivolts and is a "0" when the video input is below 200 millivolts. Similarly, the output B of comparator 32 is a "1" when the video output is greater than 400 millivolts and is a "0" when the video is output is less than 400 millivolts. Logic circuitry 34 then provides an output to input scaler 24 in accordance with the code of A and B, as follows:

| A | B | Old Gain | Output Level | New Gain |
|---|---|----------|--------------|----------|
| 0 | 0 | 1        | 150 mv       | ERROR    |
| 1 | 0 | 1        | 300 mv       | 1        |
| 1 | 1 | 1        | 600 mv       | 0.5      |
| 0 | 0 | 0.5      | 150 mv       | 1        |

-continued

| A | B | Old Gain | Output Level | New Gain |
|---|---|----------|--------------|----------|
| 1 | 0 | 0.5 | 300 mv | 0.5 |
| 1 | 1 | 0.5 | 600 mv | ERROR |

From the above table it is seen that the old gain is not changed so long as the output level is 300 millivolts, but the old gain is halved if the output voltage is 600 millivolt and the old gain is doubled when the output voltage is 150 millivolts.

By so adjusting the input to a video source such as a current DAC by a level detector which monitors the output of the video source, the output voltage can be maintained at a desired level by suitable adjustment of the input to the video source. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A video circuit for maintaining video signal voltage level to a varying load comprising:
   a) a video signal source,
   b) a video signal receiver,
   c) a transmission line for transmitting a video signal from the source to the receiver,
   d) a level detector for detecting the voltage level of the video signal, the level detector comparing the voltage level to known voltage levels and determining if the voltage level is above or below the known voltage levels, wherein one known voltage level is below the desired level of voltage and one known voltage level is above the desired level of voltage, and
   e) a signal scaler for adjusting an input signal to the video source in response to the level detector in order to maintain a desired voltage level of the video signal.

2. The video circuit as defined by claim 1 wherein the level detector comprises a first comparator for comparing the voltage level to the voltage level below the desired level and generating an output A, and a second comparator for comparing the voltage level to the voltage level above the desired level and generating an output B.

3. The video circuit as defined by claim 2 wherein gain of the signal scaler is varied between two levels depending on the values of A and B.

4. The video circuit as defined by claim 3 wherein the input signal is digital and the scaler shifts the bits of the input signal.

5. The video circuit as defined by claim 4 wherein the video signal source comprises a current DAC.

6. The video circuit as defined by claim 1 wherein the input signal is digital and the scaler shifts the bits of the input signal.

7. The video circuit as defined by claim 6 wherein the video signal source comprises a current DAC.

8. The video circuit as defined by claim 1 wherein the video signal source comprises a current DAC.

9. In a video system in which a video signal source transmits a video signal to a receiver over a transmission line, a method of maintaining a desired voltage level from the video signal source when load varies comprising the steps of:
   a) monitoring the level of voltage at the output of the video signal source, including comparing the level of voltage to known voltage levels and determining if the voltage at the output is above or below the known voltage levels, wherein one known voltage level is below the desired level of voltage and one known voltage level is above the desired level of voltage, and
   b) adjusting an input to the video signal source as necessary to maintain a desired level of voltage.

10. The method as defined by claim 9 wherein the input to the video signal source is digital and step b) comprises shifting the digital input as necessary to maintain a desired level of voltage.

\* \* \* \* \*